(12) United States Patent
Clemens et al.

(10) Patent No.: US 7,607,523 B2
(45) Date of Patent: Oct. 27, 2009

(54) APPARATUS AND METHOD FOR LOCKING TWO SHAFTS

(75) Inventors: Stanford Clemens, Westfield, IN (US); Kelby Hassenzahl, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 611 days.

(21) Appl. No.: 11/353,442

(22) Filed: Feb. 14, 2006

(65) Prior Publication Data

US 2007/0189848 A1 Aug. 16, 2007

(51) Int. Cl.
*F16D 11/14* (2006.01)
(52) U.S. Cl. .................................. 192/69.9; 403/359.4
(58) Field of Classification Search .............. 403/359.4; 192/69.9, 69.2, 69.3, 69.91
See application file for complete search history.

(56) References Cited

U.S. PATENT DOCUMENTS

| | | | |
|---|---|---|---|
| 2,883,020 A | 9/1959 | Kummich et al. | |
| 3,358,800 A * | 12/1967 | Clements | 192/69.3 |
| 4,069,903 A | 1/1978 | Clements et al. | |
| 4,084,673 A * | 4/1978 | Clements | 192/69.3 |
| 4,473,752 A | 9/1984 | Cronin | |
| 4,679,675 A | 7/1987 | Hanks et al. | |
| 4,871,296 A | 10/1989 | Laessle et al. | |
| 4,899,534 A | 2/1990 | Sorenson | |
| 4,914,906 A | 4/1990 | Burch | |
| 4,960,344 A | 10/1990 | Geisthoff et al. | |
| 5,267,433 A | 12/1993 | Burch | |
| 5,273,499 A | 12/1993 | Friedl et al. | |
| 5,383,540 A | 1/1995 | Macdonald | |
| 5,499,951 A | 3/1996 | Showalter | |
| 5,715,901 A | 2/1998 | Tokushima | |
| 5,908,080 A * | 6/1999 | Bigley et al. | 192/69.41 |
| 6,193,042 B1 | 2/2001 | Kempf et al. | |
| 6,520,305 B2 | 2/2003 | Dick | |
| 6,938,746 B2 | 9/2005 | Skorucak | |

* cited by examiner

*Primary Examiner*—Rodney H Bonck
(74) *Attorney, Agent, or Firm*—MacMillan, Sobanski & Todd, LLC

(57) ABSTRACT

The invention provides a lock mechanism and method for selectively coupling two concentric shafts rotatable about a common axis. The lock mechanism includes a locking ring assembly movable along an axis of rotation of two rotatable shafts between a locked position to transmit rotation between the two shafts and an unlocked position. The lock mechanism also includes a first locking portion extending radially from the locking ring assembly and circumferentially about the axis of rotation for engaging a first of the two shafts. The lock mechanism also includes a second locking portion extending radially from the locking ring assembly opposite the first locking portion and circumferentially about the axis of rotation for engaging a second of the two shafts. The lock mechanism also includes a third locking portion extending radially from the locking ring assembly opposite the first locking portion and circumferentially about the axis of rotation for engaging a second of the two shafts and spaced the second locking portion along the axis of rotation.

17 Claims, 3 Drawing Sheets

APPARATUS AND METHOD FOR LOCKING TWO SHAFTS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. N00019-02-C-3003 awarded by United States Department of Defense.

BACKGROUND OF THE INVENTION

1. Field of the Invention

The invention relates to an apparatus and method for locking two shafts and more particularly to a lock mechanism for selectively connecting two shafts that rotate about a common axis.

2. Description of Related Prior Art

A dog clutch is used for positively coupling together two shafts and includes a driven coupling-part and a driving coupling-part. Each coupling-part incorporates axially extending drive claws with recesses located between each drive claw. The drive claws of one coupling-part will slide into the recesses of the other coupling-part during engagement. The dog clutch can compensate for changes in the axial length of the shafts caused by heat, for example, or due to unpredictable constructional inaccuracies.

SUMMARY OF THE INVENTION

The invention provides a lock mechanism and method for selectively coupling two concentric shafts rotatable about a common axis. The lock mechanism includes a locking ring assembly movable along an axis of rotation of two rotatable shafts between a locked position to transmit rotation between the two shafts and an unlocked position spaced from the locked position. The lock mechanism also includes a first locking portion extending radially from the locking ring assembly and circumferentially about the axis of rotation for engaging a first of the two shafts. The lock mechanism also includes a second locking portion extending radially from the locking ring assembly opposite the first locking portion and circumferentially about the axis of rotation for engaging a second of the two shafts. The lock mechanism also includes a third locking portion extending radially from the locking ring assembly opposite the first locking portion and circumferentially about the axis of rotation for engaging the second of the two shafts. The third locking portion is spaced the second locking portion along the axis of rotation.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EXEMPLARY EMBODIMENT

Figure 1:
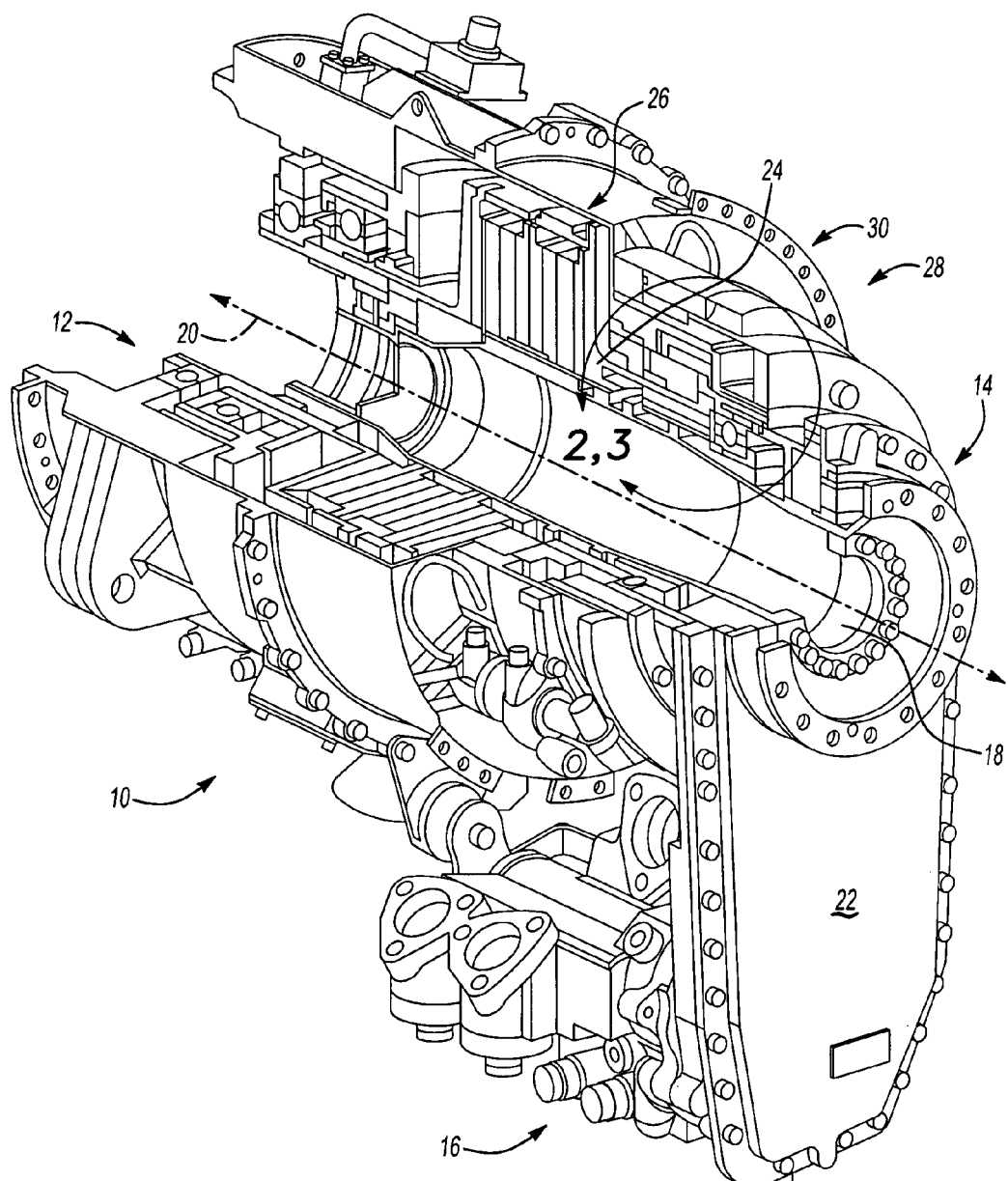
FIG. 1 is a perspective view with a partial cut-away of a clutch assembly having a lock mechanism according to the exemplary embodiment of the invention.

The exemplary embodiment of the invention relates to a clutch assembly 10 for selectively coupling an input shaft 18 and an output shaft 24. Both shafts 18, 24 rotate about an axis 20. A lock mechanism 28 moves along the axis 20 to selectively couple the shafts 18, 24. The lock mechanism 28 moves between an unlocked position (shown in FIG. 2) and a locked position (shown in FIG. 3). When the locking mechanism 28 is in the unlocked position, the shafts 18, 24 are not coupled to one another. When the locking mechanism 28 is in the locked position, the shafts 18, 24 are coupled to one another.

The exemplary lock mechanism 28 and the exemplary shafts 18, 24 include several sets of splines to effectuate coupling of the shafts 18, 24. Alternative embodiments of the invention could use structures different than splines to effectuate coupling. In the exemplary embodiment of the invention, each individual spline extends parallel to the axis 20 of rotation and each set of splines extends circumferentially about the axis 20. Each set of splines preferably extends fully around the axis 20, but could extend less than 360 degrees around the axis 20 in alternative embodiments of the invention. Each of the individual sets of splines is generally referred to as a locking portion. The exemplary locking portions have been designated numerically. For example, the application below describes "first" through "eighth" locking portions. The numerical designations as used in the application are intended to distinguish sets of splines from one another and do not imply that any particular structural member includes a specific number of spline sets. For example, the output shaft 24 of the exemplary embodiment of the invention includes an "eighth" locking portion 34. However, the exemplary output shaft 24 does not include seven other locking portions.

FIG. 1 shows the operating environment of the exemplary embodiment of the invention in perspective view. The operating environment of the exemplary embodiment of the invention is a clutch assembly 10 operable to selectively couple a gas turbine engine with a lift fan. An end 12 of the clutch assembly 10 engages a gearbox of a lift fan (not shown) and an end 14 of the clutch assembly 10 attaches to a gas turbine engine (not shown). The clutch assembly 10 can be disposed in an aircraft that is capable of both conventional take-off and landing as well as capable of vertical take-off and vertical landing. The exemplary clutch assembly 10 engages the lift fan for short take-off and vertical landing. The clutch assembly 10 includes an oil pump 16 for lubricating at least one moving component of the clutch assembly 10. The oil pump 16 is engaged with the input shaft 18 by a gear train covered by a cover 22.

The exemplary clutch assembly 10 also includes a clutch pack 26. During operation of the exemplary embodiment of the invention, the clutch pack 26 couples the input shaft 18 and the output shaft 24 to one another up to a predetermined torque. For example, the clutch pack 26 can couple the input shaft 18 and the output shaft 24 together up to about one third of the maximum power to be transmitted through the clutch assembly 10. In the exemplary embodiment of the invention, the clutch pack 26 can transmit about one-third of 215,000 inch-lbs. of torque between the input shaft 18 and the output shaft 24. The clutch pack 26 engages the input shaft 18 and the output shaft 24 together in substantially synchronous rotation up to 9,000 rpm.

The clutch assembly 10 also includes the lock mechanism 28 for selectively coupling the input shaft 18 and the output shaft 24. In the exemplary embodiment of the invention, the lock mechanism 28 can be moved to the locked position to connect the input shaft 18 and the output shaft 24 when the power being transmitted between the shafts 18, 24 generally reaches the capacity of the clutch pack 26. For example, in operation, after the clutch pack 26 has brought the input shaft 18 and the output shaft 24 into substantially synchronous rotation at one-third power, the lock mechanism 28 can be moved from the unlocked position to the locked position and the power being transmitted between the shafts 18, 24 can be increased up to and including full power.

Figure 2:
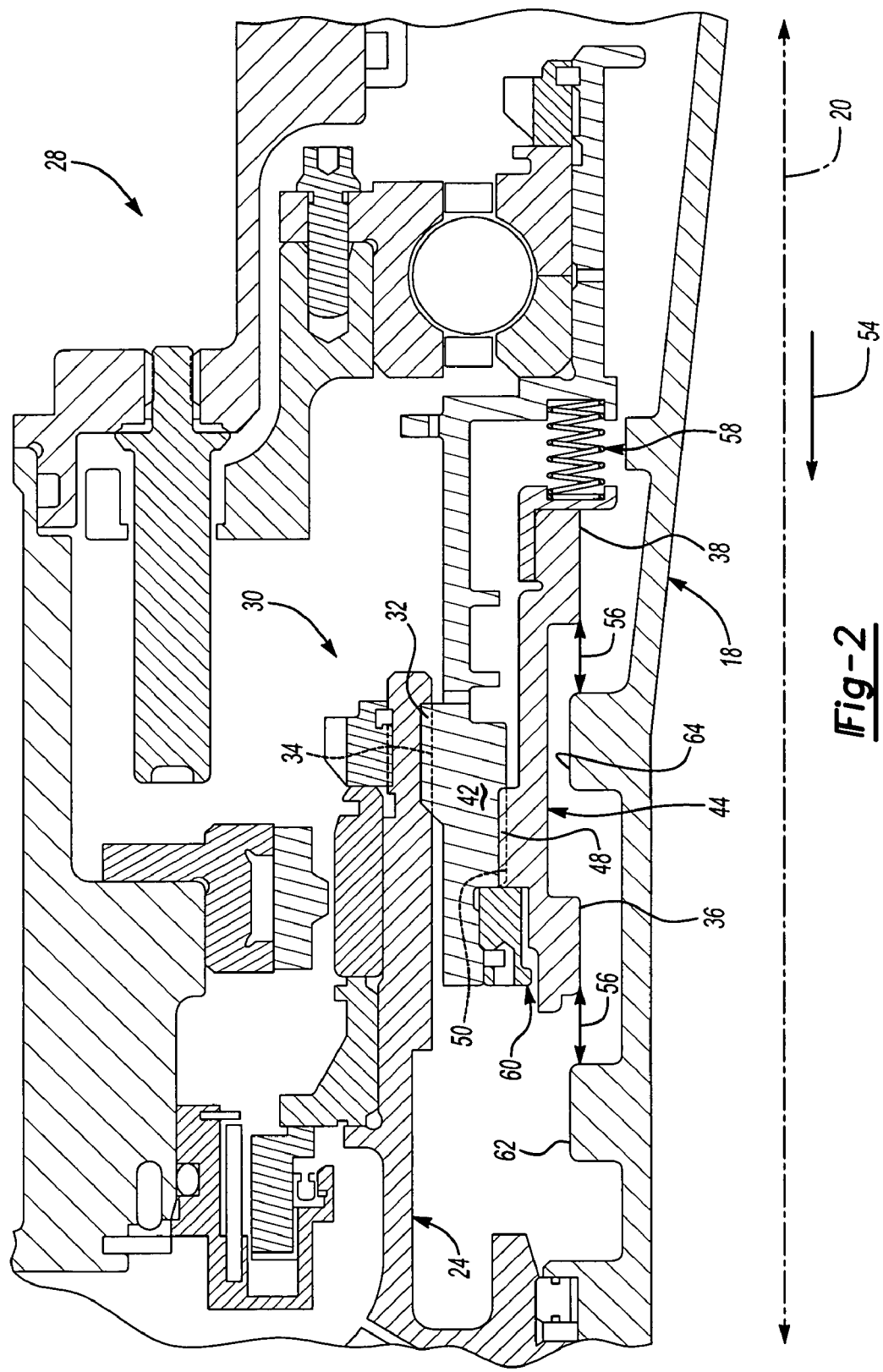
FIG. 2 is a first planar cross-sectional view taken along circular detail line 2, 3 shown in FIG. 1 and shows the lock mechanism in the unlocked position.
Figure 3:
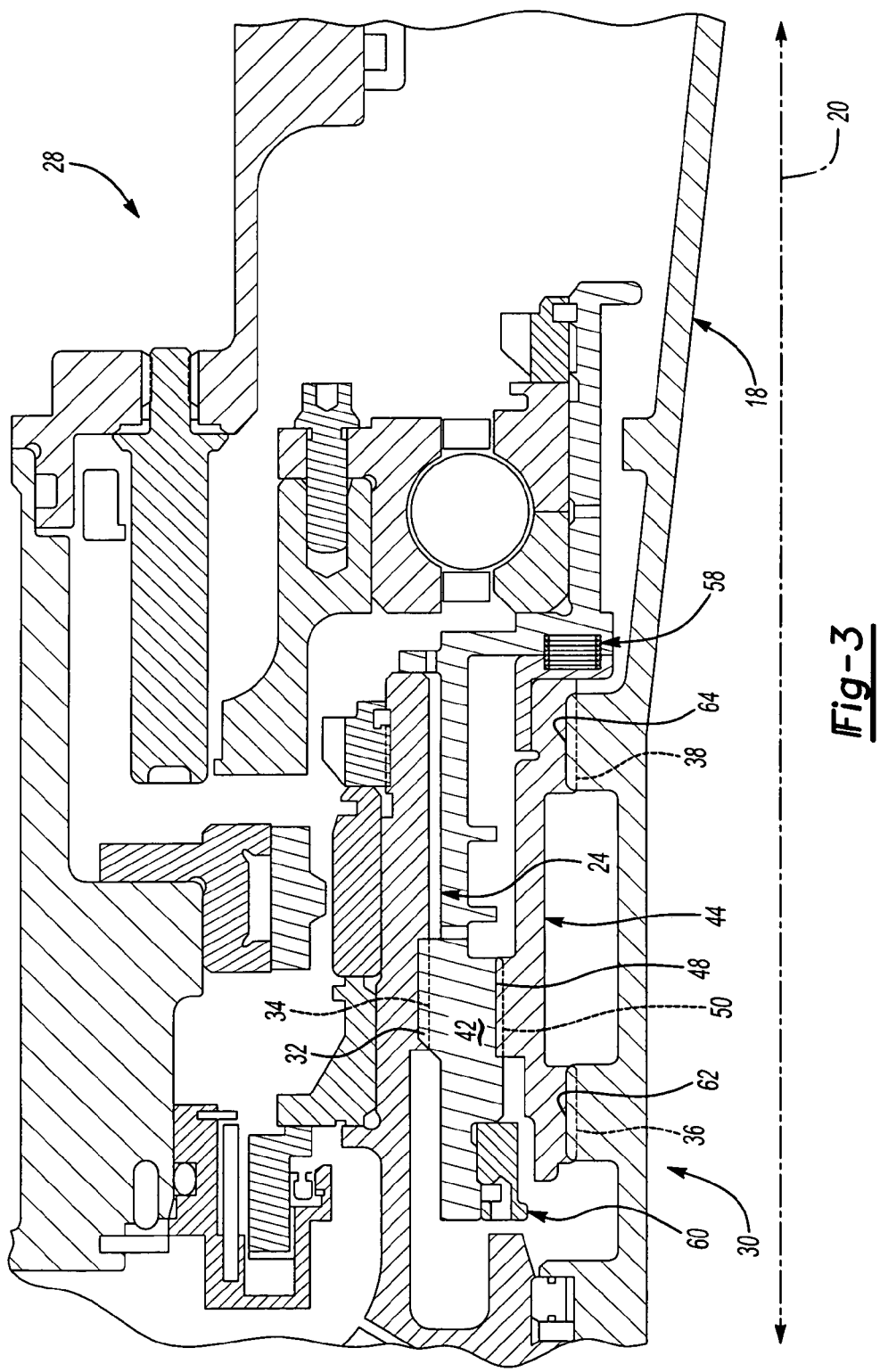
FIG. 3 is a second planar cross-sectional view taken along circular detail line 2, 3 shown in FIG. 1 and shows the lock mechanism in the locked position.

The lock mechanism 28 includes a locking ring assembly 30 movable along the axis 20 of rotation. The exemplary locking ring assembly 30 encircles the input shaft 18 and is at least partially encircled by the output shaft 24. In alternative embodiments of the invention, the locking ring assembly 30 could encircle the output shaft 24 and be at least partially encircled by the input shaft 18. As best seen in FIGS. 2 and 3, the locking ring assembly 30 includes a first locking member 42 and a second locking member 44. The first and second locking members 42, 44 are ring-like structures that at least partially overlap one another and are moveable relative to one another.

The first locking member 42 is disposed radially outward of the second locking member 44 and includes a first locking portion 32 for engaging the output shaft 24. The exemplary first locking portion 32 includes straight splines extending radially outward with respect to the axis 20, toward the output shaft 24. The first locking portion 32 engages the eighth locking portion 34. The eighth locking portion 34 is fixed to or defined by the output shaft 24. The exemplary eighth locking portion 34 is formed from straight splines extending radially inward toward the axis 20 of rotation and toward the first locking member 42. The first locking portion 32 slidably engages the eighth locking portion 34 when the locking mechanism 28 is in both the locked position and the unlocked position. The cooperation between the first and eighth locking portions 32, 34 allow the locking mechanism 28 to slide axially relative to the output shaft 24 and remain in substantially synchronous rotation with the output shaft 24.

The second locking member 44 includes a second locking portion 36 and a third locking portion 38 spaced from one another along the axis 20 for engaging the input shaft 18. Both of the exemplary second locking portion 36 and the third locking portion 38 are formed as straight splines extending radially inward from the second locking member 44 toward the input shaft 18. As a result, the second locking portion 36 and the third locking portion 38 extend radially opposite the first locking portion 32.

A sixth locking portion 62 and a seventh locking portion 64 extend from the input shaft 18 to engage the second locking portion 36 and the third locking portion 38, respectively, of the second locking member 44. The sixth locking portion 62 and the seventh locking portion 64 are spaced from one another along the axis 20. The sixth locking portion 62 and the seventh locking portion 64 are formed as straight splines extending radially outward from the input shaft 18 toward the second locking member 44.

The exemplary locking ring assembly 30 also includes a fourth locking portion 48 and a fifth locking portion 50 for slidably connecting the first locking member 42 and the second locking member 44. In that manner, the first and second locking members 42, 44 can move relative to one another axially along the axis 20 of rotation. The fourth locking portion 48 is formed from helical splines extending radially inward from the first locking member 42 toward the second locking member 44. The fifth locking portion 50 is formed from helical splines extending radially outward from the second locking member 44 toward the first locking member 42. The cooperative sliding relationship between the fourth locking portion 48 and the fifth locking portion 50 results in the first locking member 42 and the second locking member 44 be moveable relative to one another axially and rotationally. For example, when the first locking member 42 and the second locking member 44 move relative to one another along the axis 20, the fourth locking portion 48 and the fifth locking portion 50 will guide the first locking member 42 and the second locking member 44 to rotate relative to one another as well.

As best seen in the FIGS. 2 and 3, the first locking portion 32 is disposed between the second locking portion 36 and the third locking portion 38 relative to the axis 20. The positions of the second locking portion 36 and the third locking portion 38 relative to the first locking portion 32 enhances the distribution of stress associated with torque transmission. For example, the relative positions of the locking portions 32, 36, 38 can reduce the likelihood of a moment being defined that could result in torsion of the lock mechanism 28. The fourth locking portion 48 and the fifth locking portion 50 are also disposed between the second locking portion 36 and the third locking portion 38 along the axis 20. The positions of the second locking portion 36 and the third locking portion 38 relative to the fourth locking portion 48 and the fifth locking portion 50 enhances the distribution of stress associated with torque transmission in a manner similar to the relative positions of the locking portions 32, 36, 38.

In operation, an actuator (not shown) can urge the locking ring assembly 30 from the unlocked position in a direction 54 along the axis 20 of rotation to the locked position to connect the input shaft 18 and the output shaft 24 for synchronous rotation at full power. The actuator can be one or more pneumatic or hydraulic cylinders, an electric screw drive, or any combination of fluid cylinders and electric drive mechanisms. Prior to movement of the locking ring assembly 30, a stand-off gap 56 is defined between the second locking portion 36 and the sixth locking portion 62 and also between the third locking portion 38 and the seventh locking portion 64. The actuator can be disposed to act directly on the first locking member 42 to move the locking ring assembly 30 in the direction 54.

A biasing device 58 can be disposed between the first and second locking members 42, 44. As a result, the force generated by the actuator and applied to the first locking member 42 is transmitted to the second locking member 44 through the biasing device 58. The exemplary biasing device 58 is a spring that urges the first locking member 42 and the second locking member 44 apart along the axis 20 of rotation. Alternative embodiments of the invention may not include a biasing device. A spanner nut 60 is disposed opposite the biasing device 58 along the axis 20 of rotation to contain the second locking member 44 within the first locking member 42.

As the locking ring assembly 30 moves along the axis 20 of rotation, the first locking portion 32 slides within the eighth locking portion 34 and the stand-off gap 56 closes. If the splines of the second locking portion 36 are not aligned with the splines of the sixth locking portion 62 when the stand-off gap 56 closes, the splines of the second locking portion 36 will abut the splines of the sixth locking portion 62. Similarly, the splines of the third locking portion 38 will abut the splines of the seventh locking portion 64. At the same time, the first locking member 42 can continue to move in the direction 54, thus moving relative to the locking member 44 along the axis 20. The biasing device 58 will be compressed when the first locking member 42 moves relative to the second locking member 44, generating an increasing force that urges the second locking member 44 in the direction 54.

Also, the cooperation between the splines of the fourth locking portion 48 and the splines of the fifth locking portion 50 will result in the second locking member 44 rotating relative to the first locking member 42 during axial relative movement between the first and second locking members 42, 44 due to the helical spline design. The rotation of the second locking member 44 will cause the splines of the second locking portion 36 to move into alignment with the splines of the sixth locking portion 62 and, similarly, cause the splines of the third locking portion. 38 to come into alignment with the splines of the seventh locking portion 64. When the splines of the respective locking portions 36, 38, 62, 64 are aligned, the compressed biasing device 58 will urge the splines of the respective locking portions 36, 38, 62, 64 together into sliding, locking engagement.

In operating environments such as the exemplary environment, the available distance for movement of the lock mechanism 28 between the unlocked position and the locked position can be limited. This distance of travel is called the lock stroke. The length of the stroke is determined by the stand-off gap 56, the extent of helical spline travel between the fourth locking portion 48 and the fifth locking portion 50, and a predetermined input spline length. The input spline length is relatively fixed for a given torque level in order to keep contact stresses on the spline teeth below an acceptable value. In other words, the splines of cooperating locking portions will mesh over the predetermined input spline length to reduce the likelihood that the splines will experience excessive stress.

The invention provides split spline design that results in greater load capacity for a particular input spline length. The length of the lock stroke can be reduced in half while maintaining a desired input spline length. For example, when the splines of the locking portions 36, 38, 62, 64 are in meshing engagement, one inch of travel of the second locking member 44 in the direction 54 relative to the input shaft 18 will result in two inches of input spline length. The splines of the second locking portion 36 and the splines of the sixth locking portion 62 will be meshed for one inch and the splines of the third locking portion 38 and the splines of the seventh locking portion 64 will be meshed for one inch. As a result, one inch of stroke length results in two inches of input spline length. Thus, the split spline allows for a shorter stroke length which, in turn, allows for a shorter clutch assembly. Furthermore, the shorter clutch assembly provides the benefit of a clutch assembly of lower weight.

In alternative embodiments of the invention, more than two, spaced locking portions could be used to engage the input shaft 18 and the lock mechanism 28 together. For example, the second locking member 44 could include three or more locking portions extending radially inward toward the input shaft 18. In such an embodiment of the invention, the input shaft could have a corresponding number of locking portions extending radially outward toward the second locking member 44.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A lock mechanism for selectively coupling two concentric shafts rotatable about a common axis of rotation comprising:
   a locking ring assembly movable along said axis of rotation of the two concentric shafts between a locked position and an unlocked position;
   a first locking portion extending radially from said locking ring assembly circumferentially about said axis of rotation for engaging a first of the two shafts;
   a second locking portion extending radially from said locking ring assembly opposite said first locking portion circumferentially about said axis of rotation for engaging a second of the two shafts; and
   a third locking portion spaced from said second locking portion along said axis of rotation and extending radially from said locking ring assembly opposite said first locking portion circumferentially about said axis of rotation for engaging the second of the two shafts, wherein all of said first, second and third locking portions are operable to move along said rotation axis,
   and wherein said locking ring assembly further comprises:
      a first locking member extending about said axis of rotation wherein said first locking portion extends from said first locking member;
      a second locking member extending about said axis of rotation wherein said second locking portion and said third locking portion extend from said second locking member; and
      a fourth locking portion extending radially from said first locking member opposite said first locking portion circumferentially about said axis of rotation; and
      a fifth locking portion extending radially from said second locking member opposite said second and third locking portions circumferentially about said axis of rotation wherein said fourth locking portion and said fifth locking portion engage one another and guide relative movement between said first locking member and said second locking member along said axis of rotation.

2. The lock mechanism of claim 1 wherein said fourth locking portion and said fifth locking portion are formed from helical splines and said relative movement includes axial movement and rotational movement.

3. The lock mechanism of claim 1 wherein said fourth locking portion and said fifth locking portion are further defined as a being disposed between said second locking portion and said third locking portion along said axis of rotation.

4. The lock mechanism of claim 1 wherein said first, second, third, and fourth locking portions are formed from straight splines.

5. The lock mechanism of claim 1 further comprising:
   a resilient biasing device disposed between said first locking member and said second locking member.

6. A coupling arrangement for two shafts rotatable about a common axis:
   an input shaft disposed for rotation about a axis of rotation and having a sixth locking portion and a seventh locking portion each extending radially outward and circumferentially about said axis of rotation;
   an output shaft disposed for rotation about said axis of rotation and having an eighth locking portion extending radially inward and circumferentially about said axis of rotation;
   a locking ring assembly movable between an unlocked position and a locked position along said axis of rotation;

a first locking portion extending radially from said locking ring assembly circumferentially about said axis of rotation for engaging said eighth locking portion of said output shaft;

a second locking portion extending radially from said locking ring assembly opposite said first locking portion circumferentially about said axis of rotation to engage said sixth locking portion of said input shaft; and a third locking portion spaced from said second locking portion along said axis of rotation and extending radially from said locking ring assembly opposite said first locking portion circumferentially about said axis of rotation to engage said seventh locking portion of said input shaft wherein said input shaft and said output shaft are coupled to one another for synchronous rotation when said second locking portion and said third locking portions are respectively engaged with said sixth locking portion and said seventh locking portion, wherein all of said first, second and third locking portions are operable to move along said rotation axis;

and wherein said locking ring further comprises:

a first locking member extending about said axis of rotation wherein said first locking portion extends from said first locking member;

a second locking member extending about said axis of rotation wherein said second locking portion and said third locking portion extend from said second locking member;

a fourth locking portion extending radially from said first locking member toward said second locking member; and a fifth locking portion extending radially from said second locking member toward said first locking member wherein said fourth locking portion and said fifth locking portion engage one another to guide relative movement between said first locking member and said second locking member.

7. The coupling arrangement of claim 6 wherein said fourth locking portion and said fifth locking portion cooperate to guide axial and rotational movement of said first locking member and said second locking member relative to one another.

8. The coupling arrangement of claim 6 wherein said fourth locking portion and said fifth locking portion are further defined as a being disposed between said second locking portion and said third locking portion relative to said axis of rotation.

9. The coupling arrangement of claim 6 further comprising:

a resilient biasing device operable to urge said second locking portion and said third locking portion into engagement with said sixth locking portion and said seventh locking portion.

10. The coupling arrangement of claim 6 wherein at least one of said second locking portion and said third locking portion are disposed radially between said input shaft and said output shaft only during one of said locked and unlocked positions of said locking ring assembly.

11. A lock mechanism for selectively coupling two concentric shafts rotatable about a common axis of rotation comprising:

a locking ring assembly movable along said axis of rotation of the two concentric shafts between a locked position and an unlocked position:

a first locking portion extending radially from said locking ring assembly circumferentially about said axis of rotation for engaging a first of the two shafts;

a second locking portion extending radially from said locking ring assembly opposite said first locking portion circumferentially about said axis of rotation for engaging a second of the two shafts; and a third locking portion spaced from said second locking portion along said axis of rotation and extending radially from said locking ring assembly opposite said first locking portion circumferentially about said axis of rotation for engaging the second of the two shafts, wherein all of said first, second and third locking portions are operable to move along said rotation axis, wherein said first locking portion is further defined as being operable to move along said rotation axis relative to said second and third locking portions.

12. A method for coupling two shafts rotatable about a common axis comprising the steps of:

moving first, second and third locking portions of a locking ring assembly along an axis of rotation of two rotatable shafts between a locked position and an unlocked position including first moving the first, second, and third locking portions together a first predetermined distance along the rotation axis and second moving less than all of the first, second, and third locking portions a second predetermined distance along the rotation axis, said second moving step occurring after said first moving step;

engaging a first of the two shafts with the first locking portion extending radially from the locking ring assembly circumferentially about the axis of rotation;

engaging a second of the two shafts with the second locking portion extending radially from the locking ring assembly opposite the first locking portion and circumferentially about the axis of rotation; and engaging the second of the two shafts with the third locking portion spaced from the second locking portion along the axis of rotation and extending radially from said locking ring assembly opposite the first locking portion circumferentially about the axis of rotation.

13. The method of claim 12 wherein said step of engaging the second of the two shafts with the second locking portion occurs concurrent with said step of engaging the second of the two shafts with the third locking portion.

14. The method of claim 12 wherein said moving step is further defined as moving the first, second, and third locking portions a predetermined distance along the rotation axis while the first, second, and third locking portions are substantially rotationally fixed together.

15. The method of claim 14 further comprising the step of:

rotating one of the first locking portion and the second locking portion and the third locking portion after said moving step and in response to at least one of the second and third locking portions being misaligned with a locking portion rotationally fixed to the second of the two shafts.

16. The method of claim 12 further comprising the step of:

generating a force along the axis of rotation directed against the first, second, and third locking portions during said first moving step; and increasing the force during said second moving step.

17. The method of claim 12 further comprising the step of:

rotationally aligning at least one of the first, second, and third locking portions with a locking portion on one of the first and second shafts during said second moving step.

* * * * *

UNITED STATES PATENT AND TRADEMARK OFFICE
CERTIFICATE OF CORRECTION

PATENT NO.        : 7,607,523 B2                                        Page 1 of 1
APPLICATION NO.   : 11/353442
DATED             : October 27, 2009
INVENTOR(S)       : Clemens et al.

It is certified that error appears in the above-identified patent and that said Letters Patent is hereby corrected as shown below:

Column 7, Claim 11, line 64, please change ":" to -- ; --.

Signed and Sealed this

Eighth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,607,523 B2
APPLICATION NO. : 11/353442
DATED : October 27, 2009
INVENTOR(S) : Clemens et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 866 days.

Signed and Sealed this

Twelfth Day of October, 2010

David J. Kappos
*Director of the United States Patent and Trademark Office*